(12) United States Patent
Liu et al.

(10) Patent No.: US 6,603,893 B1
(45) Date of Patent: Aug. 5, 2003

(54) METHOD AND APPARATUS FOR SWITCHING AN OPTICAL BEAM IN A SEMICONDUCTOR SUBSTRATE

(75) Inventors: Ansheng Liu, Cupertino, CA (US); Mario J. Paniccia, Santa Clara, CA (US); Dean A. Samara-Rubio, Pleasanton, CA (US); Chi Chu, San Martin, CA (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 09/819,160

(22) Filed: Mar. 27, 2001

(51) Int. Cl.[7] .......................... G02B 6/26; G02F 1/035
(52) U.S. Cl. .................... 385/15; 385/3; 385/17
(58) Field of Search ........................ 385/27–28, 37, 385/1–3, 14–17, 40, 129–132

(56) References Cited

U.S. PATENT DOCUMENTS 6,144,779 A * 11/2000 Binkley et al. ................ 385/8
6,253,000 B1 * 6/2001 Madsen et al. ............... 385/16
6,292,597 B1 * 9/2001 Lagali et al. .................. 385/1

OTHER PUBLICATIONS

Kareenahalli, S., "Experiment Confirmation of Phase Relationships of Multimode Interference Splitters Using a Shearing–Type Near–Field Sagnac Interferometer", *IEEE Photonics Technology Letters*, vol. 9. No. 7., pp. 937–939, Jul. 1997.

Rasmussen, T., "Design and Performance Evaluation of 1–by–64 Multimode Interference Power Splitter for Optical Communications", *Journal of Lightwave Technology*, vol. 13. No. 10., pp. 2069–2074, Oct. 1995.

Rajarajan, M., "Accurate Analysis of MMI Devices with Two–Dimensional Confinement", *Journal of Lightwave Technology*, vol. 14, No. 9, Sep. 1996.

Lorenzo, R.M., "Improved self–imaging characteristics in 1×N multimode couplers", *IEE Proc. Optoelectron.*, vol. 145, No. 1, Feb. 1998.

Bachmann, M., "General self–imaging properties in N×N multimode interference couplers including phase relations", *Applied Optics*, vol. 33, No. 18, pp. 3905–3911, Jun. 20, 1994.

Smit, M.K., "PHASAR–Based WDM–Devices: Principles, Design and Applications", *IEEE Journal of Selected Topics in a Quantum Electronics*, vol. 2, No. 2, pp. 236–250, Jun. 1996.

Soldano L.B., "Optical Multi–Mode Interference Devices Based on Self–Imaging: Principles and Applications", *Journal of Lightwave Technology*, vol. 13, No. 4, pp. 615–627, Apr. 1995.

* cited by examiner

Primary Examiner—David V. Bruce
Assistant Examiner—Krystyna Suchecki
(74) Attorney, Agent, or Firm—Blakely, Sokoloff, Taylor & Zafman LLP

(57) ABSTRACT

An optical switching method and apparatus. In one aspect of the present invention, the disclosed apparatus includes first and second multi-mode interference (MMI) splitting devices in a semiconductor substrate. First and second outputs of the first MMI splitting device are optically coupled to first and second inputs, respectively, of the second MMI splitting device. First and second phase control devices are included in the semiconductor substrate. The first input of the second MMI splitting device is optically coupled to the first output of the first MMI splitting device through the first phase control device. The second input of the second MMI splitting device is optically coupled to the second output of the first MMI splitting device through the second phase control device. The first input of the first MMI splitting device is selectively optically coupled to the first and second outputs of the second MMI splitting device in response to the first and second phase control devices. The second input of the first MMI splitting device is selectively optically coupled to the first and second outputs of the second MMI splitting device in response to the first and second phase control devices.

25 Claims, 6 Drawing Sheets

METHOD AND APPARATUS FOR SWITCHING AN OPTICAL BEAM IN A SEMICONDUCTOR SUBSTRATE

BACKGROUND OF THE INVENTION

1. Field of the Invention

The present invention relates generally to the switching of signals and, more specifically, the present invention relates to switching or steering optical signals.

2. Background Information

The need for fast and efficient optical switches is increasing as Internet data traffic growth rate is overtaking voice traffic pushing the need for optical communications. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Methods and apparatuses for switching optical beams in a semiconductor substrate are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical switching device is provided in a fully integrated solution on a single integrated circuit chip. In one embodiment, a 2×2 optical switch is realized with cascaded multi-mode interference (MMI) devices with phase controlling devices optically coupled in between. In another embodiment, 2×2 optical switches in accordance with the teachings are cascaded with a MMI cross-coupling (X-coupling) device to form a 4×4 optical switch in accordance with the teachings of the present invention. Embodiments of the disclosed optical switches can be used in a variety of high bandwidth applications including multi-processor, telecommunications, networking or the like. For example, embodiments of the present invention may be employed as fast (e.g. sub-nanosecond) optical switches and/or add/drop devices in optical networking systems.

Figures 1A, 1B:
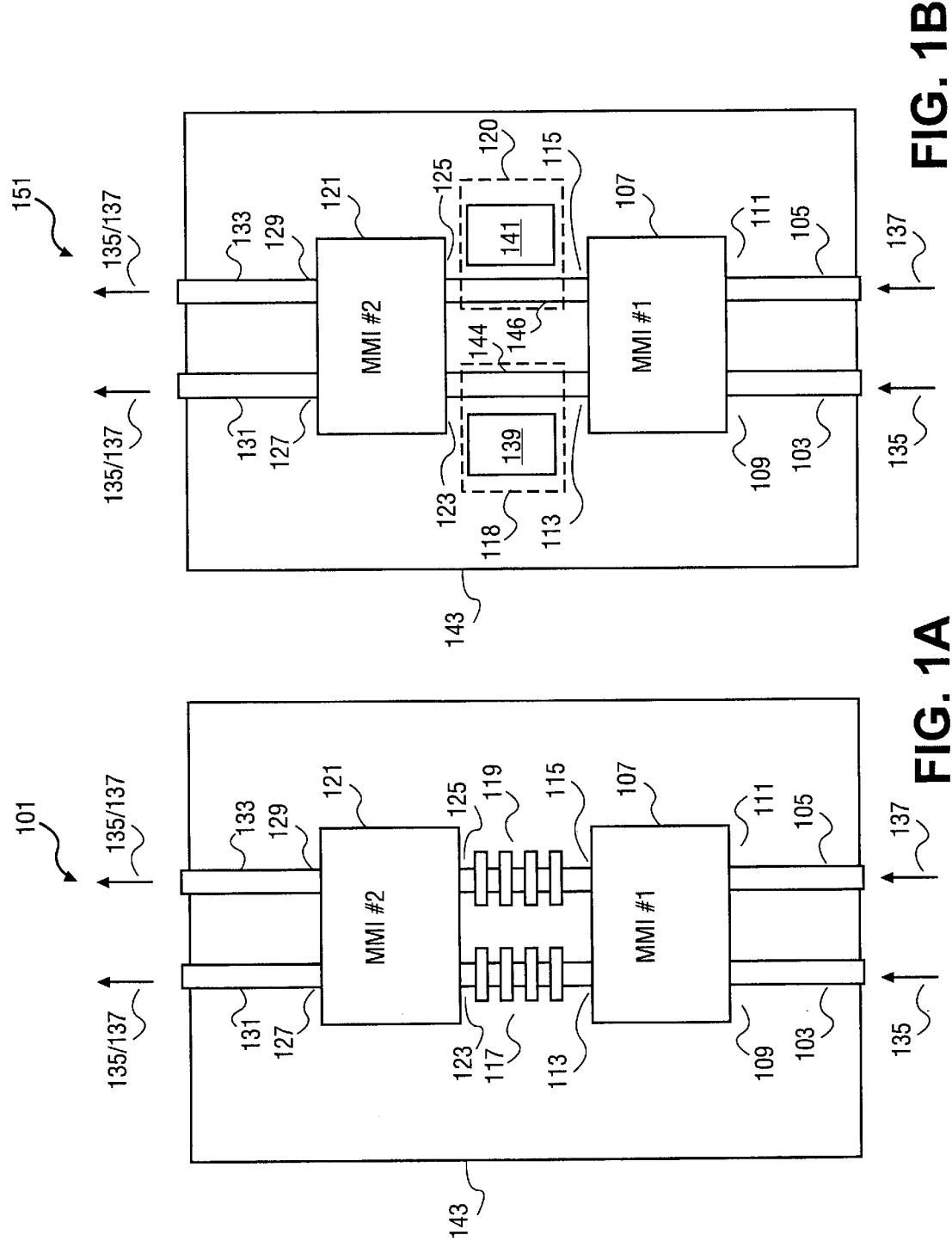
FIG. 1A is a block diagram illustrating one embodiment of a 2×2 optical switch in accordance with the teachings of the present invention.
FIG. 1B is a block diagram illustrating another embodiment of a 2×2 optical switch in accordance with the teachings of the present invention.

To illustrate, FIG. 1A is a block diagram illustrating one embodiment of a 2×2 optical switch 101 in accordance with the teachings of the present invention. As shown in the depicted embodiment, two MMI devices 107 and 121 are disposed in a semiconductor substrate 143. In one embodiment, semiconductor substrate comprises silicon or the like. In one embodiment, each of the MMI devices 107 and 121 have two inputs and two outputs. In particular, MMI device 107 has two inputs 109 and 111 and two outputs 113 and 115. MMI device 121 has two inputs 123 and 125 and two outputs 127 and 129. In one embodiment, inputs 109, 111, 123 and 125 and outputs 113, 115, 127 and 129 include waveguides that are tapered.

It is appreciated that although the terms "input" and "output" have been used herein for explanation purposes to describe for example inputs 109, 111, 113, 115, 123, 125, 127 and 129, optical beams 135 and 137 may propagate in the reverse direction or in both directions.

In one embodiment, input 109 of MMI 107 is optically coupled to receive an optical beam 135 through waveguide 103 disposed in semiconductor substrate 143 and input 111 of MMI 107 is optically coupled to receive an optical beam 137 through waveguide 105 disposed in semiconductor substrate 143. In one embodiment, optical beams 135 and 137 includes infrared or near infrared light. For example, in one embodiment, optical beams 135 and 137 have wavelengths near approximately 1.3 µm or 1.55 µm.

In one embodiment, output 113 of MMI device 107 is optically coupled to input 123 of MMI device 121 through phase control device 117 and output 115 of MMI device 107 is optically coupled to input 125 of MMI device 121 through phase control device 119. In one embodiment, phase control devices 117 are disposed in semiconductor substrate 143 and are employed to selectively control the relative phase differences between optical beams output from outputs 113 and 115, which are received at inputs 123 and 125. In one embodiment, MMI device 121 includes outputs 127 and 129, which are optically coupled to waveguides 131 and 133, respectively, such that optical beams 135 and 137 are switchably coupled to be directed through waveguides 131 and/or 133.

In one embodiment, when light, such as for example optical beam 135 or 137, propagates through one of the waveguides 103 or 105 into input 109 or 111, respectively, of MMI device 107, MMI device 107 splits the optical beam 135 or 137 into two optical beams with substantially equal amplitude. In one embodiment, these two split optical beams are then optically coupled to inputs 123 and 125 of MMI device 121 through phase control devices 117 and 119, respectively.

In one embodiment, the relative phase difference between the split optical beam 135 received at input 123 and the split optical beam 135 received at input 125 is selectively controlled to be either substantially π/2 or −π/2 in response to phase control devices 117 and 119. As a result of the selectable phase difference between the two split optical beams received at inputs 123 and 125, one optical beam 135 is output at only one of the two outputs 127 and 129 of MMI device 121. For example, if the phase difference between the two split optical beams received at inputs 123 and 125 is selectively controlled to be approximately π/2 by phase control devices 117 and 119, then optical beam 135 is output from one of the outputs 127 or 129. Similarly, if the phase difference is selectively controlled to be approximately −π/2 by phase control devices 117 and 119, then optical beam 135 is output from the other one of the outputs 127 or 129. An optical beam output from output 127 is optically coupled to be propagated through waveguide 131 and an optical beam output from output 129 is optically coupled to be propagated through waveguide 133. In one embodiment, optical fibers (not shown) are optically coupled to waveguides 103, 105, 107 and 109.

It is noted that the operation of optical switch 101 has been described above showing optical beam 135 received at optical input 109 and selectively optically coupled to outputs 127 and 129. As shown, in one embodiment, optical beam 137 is received at the other optical input 111. In operation, input 111 is also selectively coupled to one of the outputs 127 or 129 utilizing phase control devices 117 and 119. As mentioned, in one embodiment, light may travel in the opposite direction such that output 127 is selectively optically coupled to input 109 or 111 and output 129 is selectively optically coupled to input 109 or 111.

FIG. 1B is a block diagram illustrating another embodiment of a 2×2 optical switch 151 in accordance with the teachings of the present invention. In one embodiment, optical switch 151 of FIG. 1B is identical to optical switch 101 of FIG. 1A with the exception of phase control devices 118 and 120 optically coupling input 123 to output 113 and input 125 to output 115, respectively. In particular, in the embodiment illustrated in FIG. 1A, phase control devices 117 and 119 of optical switch 101 are illustrated as waveguides including trench capacitors to control the relative phase difference between the split optical beams, which will be described in greater detail below. However, in the embodiment illustrated in FIG. 1B, phase control devices 118 and 120 include thermal heaters 139 and 141 disposed proximate to waveguides 144 and 146, respectively. Waveguide 144 optically couples input 123 to output 113 and waveguide 146 optically couples input 125 to output 115. Using known techniques, thermal heaters 139 and 141 can control the temperature of semiconductor substrate 143 such that the relative phase difference between the optical beams propagating through waveguides 144 and 146 can be controlled to switchably couple input 109 to output 127 or 131 and switchably couple input 111 to output 127 or 131 in accordance with the teachings of the present invention.

Figure 2:
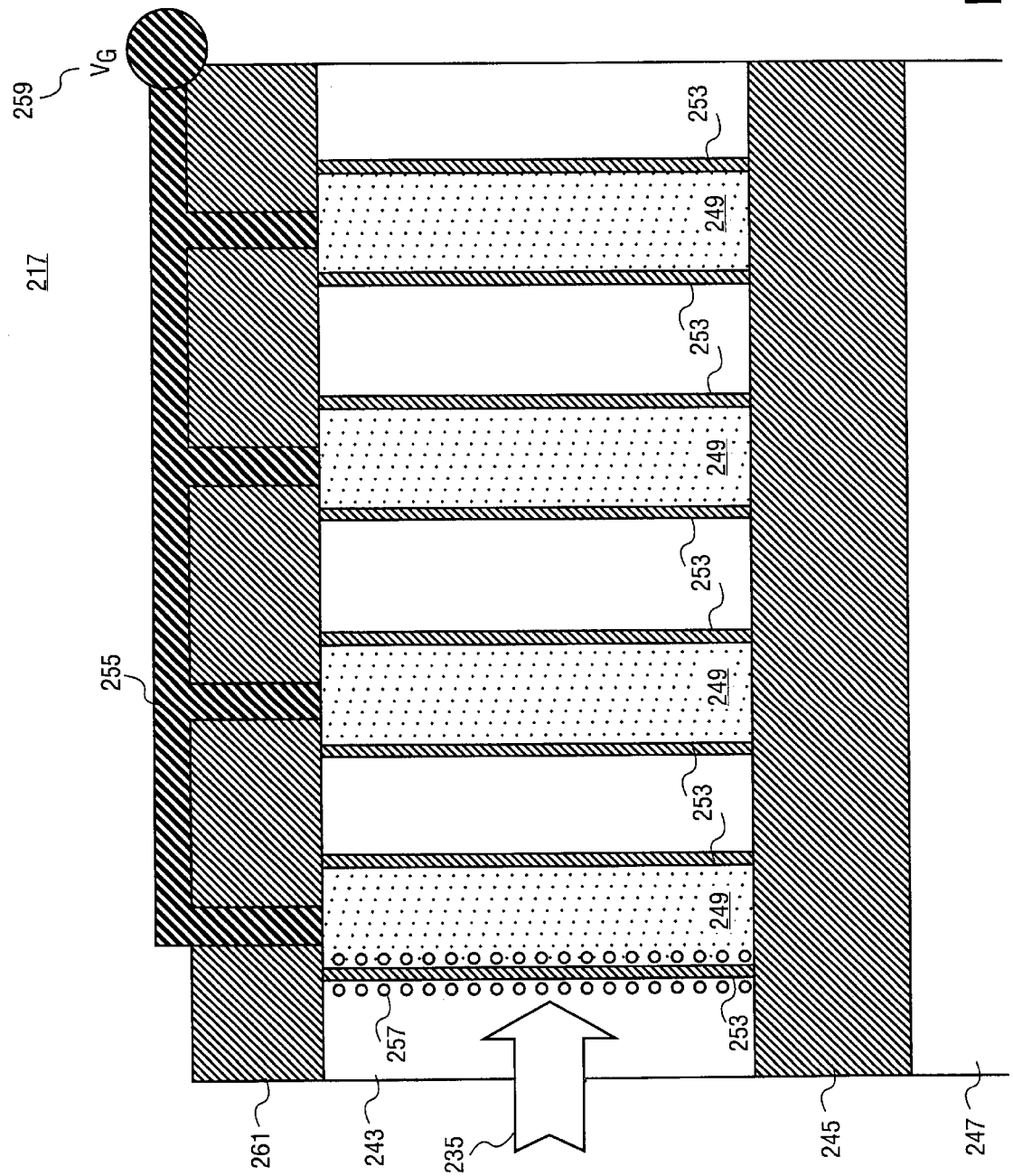
FIG. 2 is a cross-section view illustration along one embodiment of a waveguide of a phase control device of in accordance with the teachings of the present invention.

FIG. 2 is a cross-section view illustration of one embodiment of a waveguide of one of a phase control device 217 of an optical switch in accordance with the teachings of the present invention. In one embodiment, phase control device 217 may be used in place of phase control device 117 and/or 119 of optical switch 101 of FIG. 1A. In one embodiment, phase control device 217 is a trenched silicon rib waveguide in semiconductor substrate 143. As shown in the depicted embodiment, a plurality of trench capacitors are formed with polysilicon regions 249 disposed in semiconductor substrate 243. In one embodiment, insulating regions 253 are disposed between polysilicon regions 249 and semiconductor substrate to form the trench capacitors.

In one embodiment, the wafer on which phase control device 217 is disposed is a silicon-on-insulator (SOI) wafer. Accordingly, a buried insulating layer 245 is disposed between semiconductor substrate 243 and semiconductor substrate 247 of the SOI wafer. In addition, semiconductor substrate 243 is disposed between buried insulating layer 245 and insulating layer 261. In one embodiment, insulating layer 261 is an interlayer dielectric layer of the wafer on which phase control element 217 is disposed.

In one embodiment, an optical waveguide, such as for example a rib waveguide, is disposed in semiconductor substrate 243 between insulating layers 261 and 245. As such, an optical beam 235 is illustrated in FIG. 2 propagating from left to right. In one embodiment, optical beam 235 includes infrared or near infrared light. As mentioned, in one embodiment, semiconductor substrate 243 includes silicon. As known to those skilled in the art, silicon is partially transparent to infrared or near infrared light. For instance, in one embodiment in which phase control device 217 is utilized in telecommunications, optical beam 235 has an infrared wavelength of approximately 1.3 or 1.55 µm. In one embodiment, insulating layers 245 and 261 include an oxide material and optical beam 235 is therefore confined to remain within the waveguide between insulating layers 245 and 261 as a result of total internal reflection since oxide has a smaller index of refraction than silicon or polysilicon.

As shown in the embodiment of FIG. 2, polysilicon regions 249 are coupled to receive a control signal $V_G$ 259 through conductors 255 routed through insulating layer 261. In the depicted embodiment, the trench capacitors formed by polysilicon regions 249 in semiconductor substrate 243 are biased in response to the control signal $V_G$ 259 such that the concentration of free charge carriers in charged regions 257 is modulated. For instance, in one embodiment, when $V_G$ 259 is varied, injected free electrons and holes included in accumulations layers of charge regions 257 accumulate at the interfaces between the polysilicon regions 249 and insulating regions 253 and at the interfaces between semiconductor substrate 243 and insulating regions 253. Accordingly, as optical beam 235 propagates through the waveguide between insulating layers 245 and 261, optical beam 235 propagates through the modulated charged regions 257.

Referring back to FIG. 2, the phase of optical beam 235 passing through free charge carriers in charged regions 257 is modulated due to the plasma optical effect. The plasma optical effect arises due to an interaction between the optical electric field vector and free charge carriers that may be present along the propagation path of the optical beam 235. The electric field of the optical beam 235 induces a change in the velocity of the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta nL \quad \text{(Equation 1)}$$

with the optical wavelength in vacuum $\lambda$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{\Delta N_e}{m_e^*} + \frac{\Delta N_h}{m_h^*}\right) \quad \text{(Equation 2)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively.

It is noted that four trench capacitors have been illustrated in FIG. 2 for explanation purposes with polysilicon regions 249 disposed in semiconductor substrate 243. It is appreciated that in other embodiments, there may be a greater or fewer number of trench capacitors in accordance with the teachings of the present invention with the number of trench capacitors chosen to achieve the required phase shift. In particular, the interaction length L discussed in connection with Equation 1 above may be varied by increasing or decreasing the total number of trench capacitors of phase control device 217.

Therefore, in one embodiment, the phase of optical beam 235, which passes through the charged regions 257, is modulated in response to the control signal $V_G$ 259. Referring to FIGS. 2 and 1A, by varying $V_G$ 259, an optical beam 235, 135 or 137 can be switched between the two outputs 127 or 129. In an embodiment in which optical beams 135 and 137 have different wavelengths, optical beams 135 and 137 can be directed into inputs 109 and 111 simultaneously. Since the optical beams 135 and 137 have different wavelengths, both optical beams 135 and 137 can be switched between outputs 127 and 129 without blocking each other in accordance with the teachings of the present invention.

Figure 3:
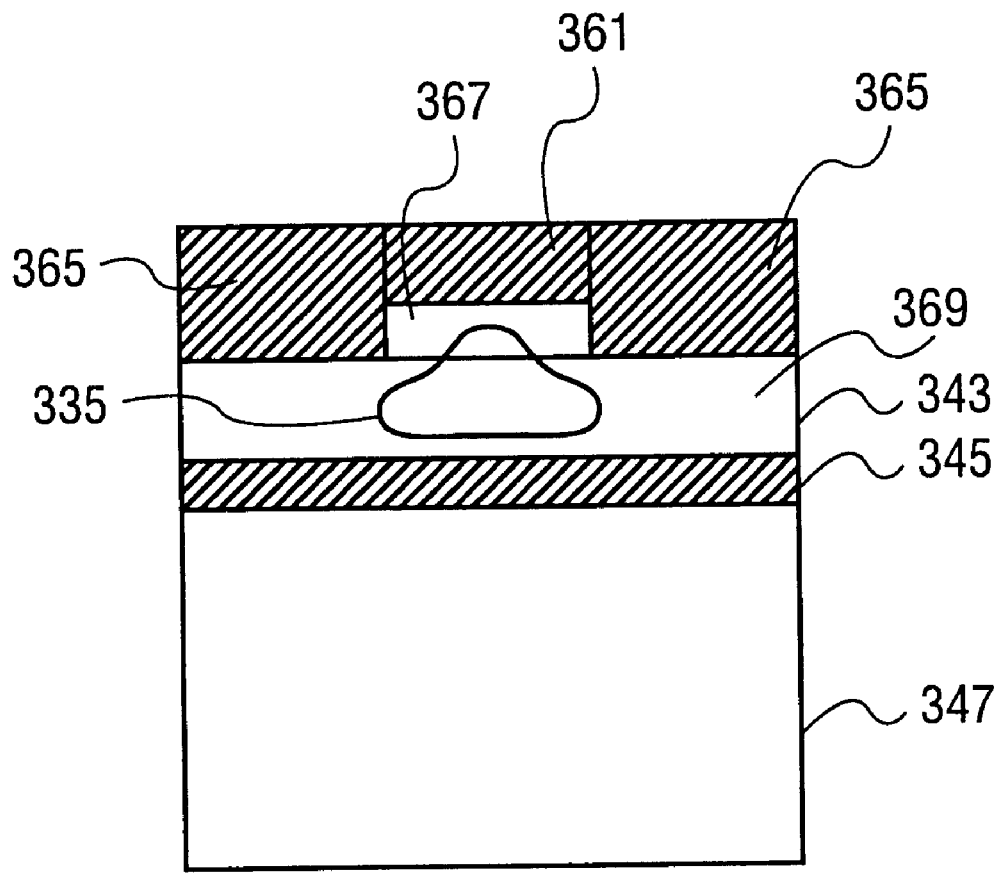
FIG. 3 is a cross-section view illustration across one embodiment of a rib waveguide of a phase control device of in accordance with the teachings of the present invention.

FIG. 3 is a cross-section view illustration across one embodiment of a rib waveguide of a phase control device 317 in accordance with the teachings of the present invention. As shown, the rib waveguide includes a rib region 367 and a slab region 369. In one embodiment, rib region 367 is disposed proximate to insulating layer 361 and is disposed between lateral optical confinement regions 365. In one embodiment, lateral optical confinement regions 365 included oxide and insulating layer 361 is an interlayer dielectric layer of a wafer including oxide. In one embodiment, slab region 369 is included in semiconductor substrate layer 343 and is disposed between rib region 367 and an insulating layer 345. In one embodiment, insulating layer 345 is a buried oxide layer of an SOI wafer and is disposed between semiconductor substrate layers 343 and 347.

In the embodiment illustrated in FIG. 3, the intensity distribution of a single mode optical beam 335 is shown propagating through the rib waveguide of phase control device 317. As shown, the intensity distribution of optical beam 335 is such that of the majority of the optical beam 335 propagates through a portion of rib region 369 towards the interior of the rib waveguide. In addition, a portion of optical beam 335 propagates through a portion of slab region 367 towards the interior of the rib waveguide. As also shown with the intensity distribution of optical beam 335, the intensity of the propagating optical mode of beam 335 is vanishingly small at the "upper corners" of rib region 367 as well as the "sides" of slab region 369. In another embodiment, it is appreciated that the orientation of the rib waveguide may be inverted in accordance with the teachings of the present invention. Accordingly, rib region 367 may be disposed proximate to insulating layer 345 and slab region 369 may be disposed proximate to insulating layer 361 in accordance with the teachings of the present invention.

Figure 4:
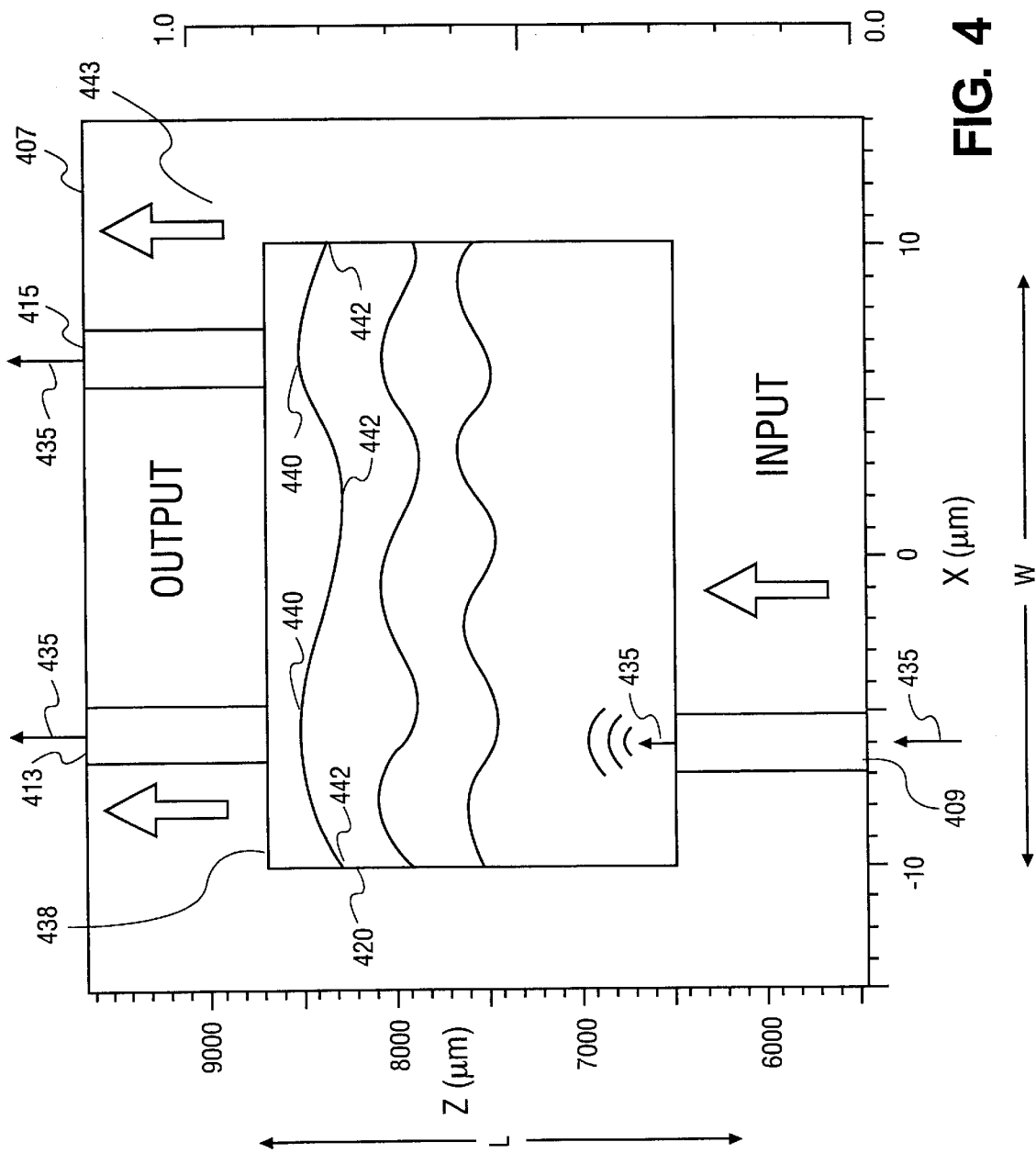
FIG. 4 is an illustration of one embodiment of one of the two multi mode interference (MMI) devices employed in a 2×2 optical switch in accordance with the teachings of the present invention.

FIG. 4 is an illustration of one embodiment of a portion of one of the MMI devices 407 employed in an optical switch device in accordance with the teachings of the present invention. As shown, MMI device 407 includes a waveguide 438 disposed in a semiconductor substrate 443. In one embodiment, an optical beam 435 is directed into waveguide 438 through input 409. In one embodiment, optical beam 435 is confined to remain within waveguide 438 with cladding 420 until exiting. As shown, the cladding 420 enclosing waveguide 438 in one embodiment has a length L and a width W and is designed to support a large number of modes in waveguide 438. In one embodiment, there are a plurality of M=2 outputs from waveguide 438 shown as waveguides outputs 413 and 415.

As illustrated in FIG. 3, optical beam 323 propagates from input 409 into waveguide 438 and is eventually deflected from the cladding 420 enclosing waveguide 438. The deflected wavefronts of optical beam 435 interfere with each other within waveguide 438 of MMI device 407 such that maximas 440 and minimas 442 are created as shown. In one embodiment, L and W are designed such that there is a maxima 440 located at each output location corresponding to the outputs 413 and 415. Thus, the M=2 outputs 413 and 415 of MMI device 407 are optically coupled to the input 409 of MMI device 407 and MMI device 407 therefore functions as a 1×2 splitter in accordance with the teachings of the present invention. In one embodiment, split optical beams 435 output from outputs 413 and 415 have substantially equal amplitude. Accordingly, the optical power of split optical beams 435 output from outputs 413 and 415 is substantially equal.

It is appreciated that MMI device 407 has been illustrated for clarity including one input 409. However, it is appreciated that another input (not shown) is included and that an optical beam input to the second input is also split and output at outputs 413 and 415 is described above. In addition, it is appreciated that the direction of propagation of the optical beams may be reversed in accordance with the teachings of the present invention. Furthermore, depending on the relative phase difference between the optical beams directed into outputs 413 and 415, the optical beam is selectively output at either input 409 or the other input not shown for clarity.

Figure 5:
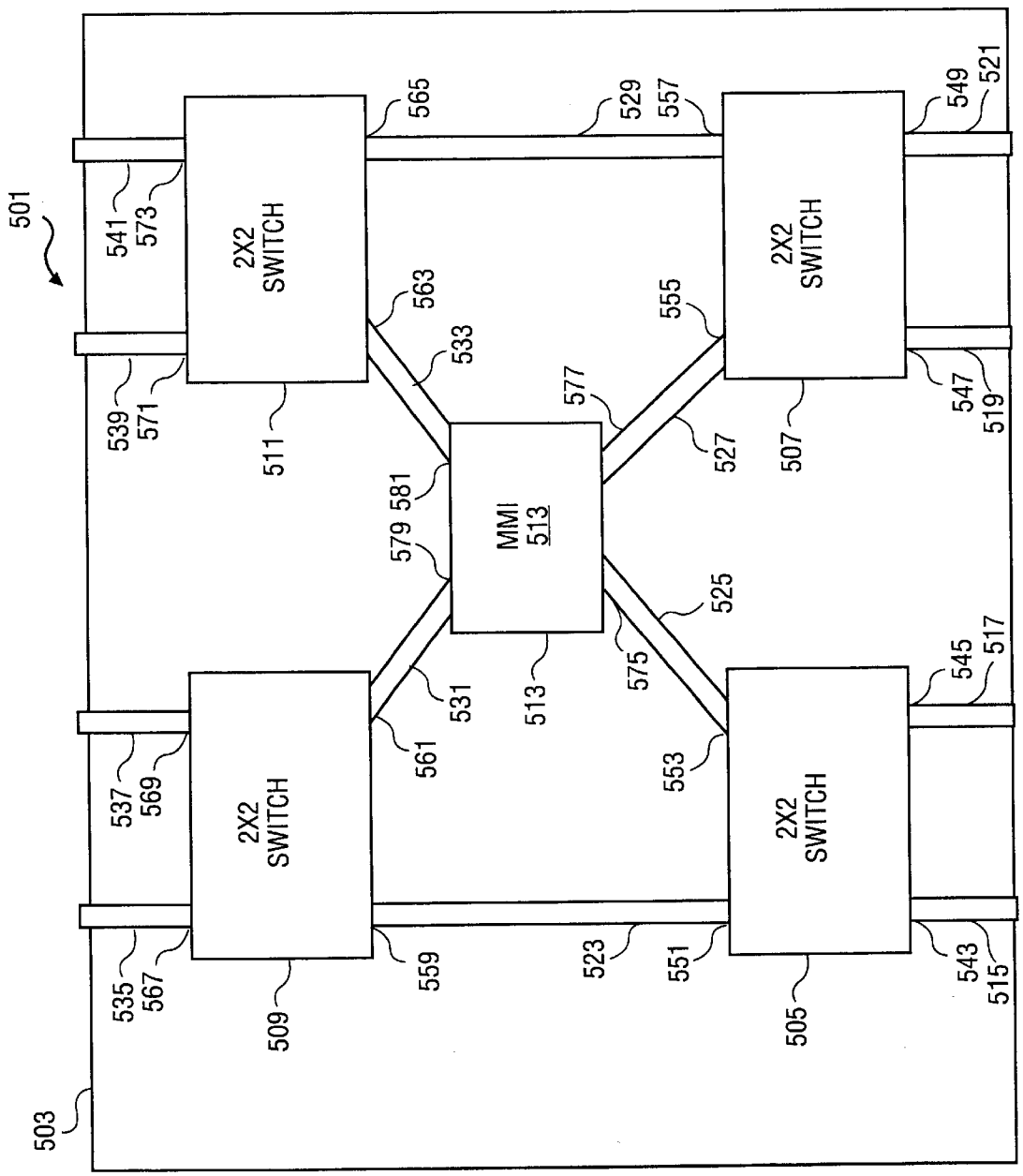
FIG. 5 is block diagram illustrating one embodiment of a 4×4 optical switch in accordance with the teachings of the present invention.

FIG. 5 is block diagram illustrating one embodiment of a 4×4 optical switch 501 in accordance with the teachings of the present invention. As shown, one embodiment of optical switch 501 employs a plurality of 2×2 optical switches similar to those illustrated and described above in FIGS. 1A through 4. In particular, optical switch 501 includes 2×2 optical switches 505, 507, 509 and 511 and an MMI X-coupling device 513 disposed in a semiconductor substrate 503.

As shown in the depicted embodiment, optical switch 505 includes inputs 543 and 545, which are coupled to receive optical beams through waveguides 515 and 517, respectively. Optical switch 507 includes inputs 547 and 549, which are coupled to receive optical beams through waveguides 519 and 521, respectively. MMI X-coupling device includes inputs 575 and 577 and outputs 579 and 581. In the depicted embodiment, output 581 is optically coupled to input 575 and output 579 is optically coupled to input 577 through MMI X-coupling device 513. In addition, input 575 is optically coupled to output 553 through a waveguide 525 and input 577 optically coupled to output 555 through a waveguide 527. Optical switch 509 includes inputs 559 and 561 and outputs 567 and 569. Optical switch 511 includes inputs 563 and 565 and outputs 571 and 573. Input 559 is optically coupled to output 551 through waveguide 523 and input 561 is optically coupled to output 579 through waveguide 531. Input 563 is optically coupled to output 581 through waveguide 533 and input 565 is optically coupled to output 557 through waveguide 529. Outputs 567 569, 571 and 573 are optically coupled to generate switched optical beams through waveguides 535, 537, 539 and 541, respectively. As shown in the depicted embodiment, waveguides 515, 517, 519, 521, 523, 525, 527, 529, 531, 533, 535, 537, 539 and 541 are all disposed in semiconductor substrate 503.

In one embodiment, optical switches 505, 507, 509 and 511 function similar to the optical switch embodiments discussed above in connection with FIGS. 1A through FIG. 4. Accordingly, optical beams received through inputs 543 and 545 are switchably coupled to outputs 551 and 553. Optical beams received through inputs 547 and 549 are switchably coupled to outputs 555 and 557. Optical beams received through inputs 559 and 561 are switchably coupled to outputs 567 and 569. Optical beams received through inputs 563 and 565 are switchably coupled to outputs 571 and 573.

To illustrate example operation of optical switch 501, an optical beam may be received at input 543 of optical switch 505. If the optical beam is to be switchably coupled to output 567, optical switch 505 can selectively optically couple output 551 to input 543 and optical switch 509 can selectively optically couple output 567 to input 559. Thus, the optical beam received at input 543 will propagate through waveguides 515, 523 and 535. If the optical beam is to be switchably coupled to output 569, optical switch 509 can selectively optically couple output 569 to input 559. Thus, the optical beam received at input 543 will propagate through waveguides 515, 523 and 569.

If the optical beam is to be switchably coupled to output 571, optical switch 505 can selectively optically couple output 553 to input 543. The optical beam received at input 543 will thus propagate through waveguides 515 and 525 input 575 of MMI X-coupling device 513. Since output 581 of MMI X-coupling device 513 is optically coupled to input 575, input 563 of optical switch 511 is optically coupled to input 575 of MMI X-coupling device 513 through waveguide 533. Optical switch 511 can then selectively optically couple output 571 to input 563. Thus, the optical beam received at input 543 will propagate out from optical switch 501 through waveguide 539. If the optical beam is to be switchably coupled to output 573, optical switch 511 can selectively optically couple output 573 to input 563 such that the optical beam received at input 543 will propagate out from optical switch 501 through waveguide 541, waveguide 533, MMI X-coupling device 513, waveguide 525 and waveguide 515.

Figures 6A, 6B:
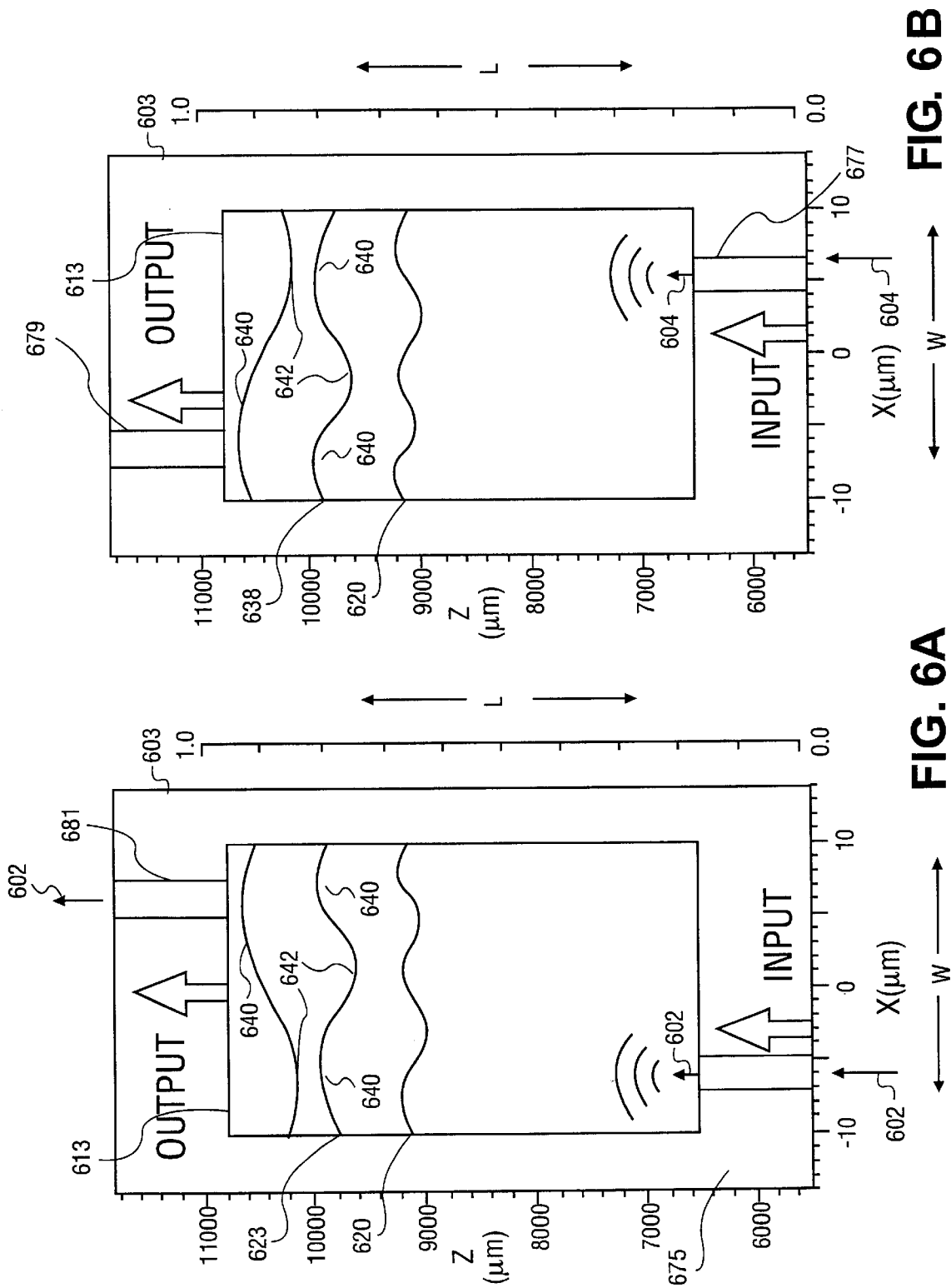
FIG. 6A is an illustration of one embodiment one of the two inputs and one of the two outputs of an MMI X-coupling device employed in a 4×4 optical switch in accordance with the teachings of the present invention.
FIG. 6B is an illustration of one embodiment another one of the two inputs and another one of the two outputs of an MMI X-coupling device employed in a 4×4 optical switch in accordance with the teachings of the present invention.

FIGS. 6A and 6B are illustrations of one embodiment an MMI X-coupling device 613, which may be employed as the MMI X-coupling device 513 of FIG. 5. FIG. 6A illustrates one of the two input/output pairs of MMI X-coupling device 613 and FIG. 6B illustrates the other one of the two input/output pairs of MMI X-coupling device 613 in accordance with the teachings of the present invention. It is appreciated that the features of MMI X-coupling device 613 have been separated between FIGS. 6A and 6B for clarity. In one embodiment, the features of MMI X-coupling device 613 in FIGS. 6A and 6B are combined.

FIGS. 6A and 6B shows that MMI X-coupling device 613 includes a waveguide 638 disposed in a semiconductor substrate 603. As shown in the embodiment of FIG. 6A, MMI X-coupling device 613 includes an input 675 optically coupled to an output 681. As shown in the embodiment of FIG. 6B, MMI X-coupling device 613 includes an input 677 optically coupled to an output 679. An optical beam 602 directed into input 602 and an optical beam 604 directed into input 677 are confined to remain within waveguide 638 with cladding 620 until exiting. As shown, the cladding 620 enclosing waveguide 638 in one embodiment has a length L and a width W and is designed to support a large number of modes in waveguide 638.

As illustrated in FIGS. 6A and 6B, optical beam 602 propagates from input 675 into waveguide 638 and is eventually deflected from the cladding 620 enclosing waveguide 638 and optical beam 604 propagates from input 677 into waveguide 638 and is eventually deflected from the cladding 620. The deflected wavefronts of optical beams 602 and 604 interfere with each other within waveguide 638 of MMI X-coupling device 613 such maximas 640 and minimas 642 are created as shown. In one embodiment, L and W are designed such that there is a maxima 640 located at each output 681 corresponding to input 675 and there is a maxima 640 located at each output 679 corresponding to input 677. Thus, MMI X-coupling device 613 exhibits X-switch behavior and interchanges the two input ports 675 and 677 with the two output ports 679 and 681.

Throughout this specification, it is noted that phase control elements employed in various embodiments of the present invention, such as for example phase control devices 117 and 119, have been illustrated using trench capacitors for discussion purposes. Trench capacitors in accordance with the teachings of the present invention produce an index of refraction change in the semiconductor substrate layers in which the trench capacitors are disposed. As discussed, the changes in index of refraction produce phase shifts of optical beams. In some embodiments, the effects of the phase shifts of the optical beams produce optical beam steering such that optical beams may be selectively directed to optical output ports in accordance with the teachings of the present invention. It is appreciated that in other embodiments, other types of phase arrays and/or phase control elements may be employed in accordance with the teachings of the present invention. Other known types of phase control elements that may be employed include for example thermal heaters, current injectors, P-N junctions, or the like.

As discussed, thermal heating of the semiconductor substrate layer in the optical beam can be employed to change the index of refraction to phase shift an optical beam. In one embodiment of the present invention, known thermal heating is accomplished in phase control element by depositing thermal heaters on the surface of a semiconductor substrate layer in the form of polysilicon resistors or implanting diffusion based resistors and passing current through these resistors. In another embodiment, known current injectors are employed in phase control element for current injection to inject charge carriers into the phase shift region of in the semiconductor substrate layer. In yet another embodiment, current injection is accomplished by a phase control element by using known forward biased diodes or P-N junctions disposed in the semiconductor substrate layer. In still another embodiment, known reverse biased P-N junctions are employed by a phase control element, which when biased cause a depletion region to be formed in the semiconductor substrate layer. The formed depletion region causes an index change by sweeping out charge carriers in the depletion region of the semiconductor substrate layer.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   first and second multi-mode interference (MMI) splitting devices in a semiconductor substrate, first and second outputs of the first MMI splitting device optically coupled to first and second inputs, respectively, of the second MMI splitting device; and
   first and second phase control devices in the semiconductor substrate, the first and second phase control devices having first and second plurality of trench capacitors, respectively, the first input of the second MMI splitting device optically coupled to the first output of the first MMI splitting device through the first phase control device, the second input of the second MMI splitting device optically coupled to the second output of the first MMI splitting device through the second phase control device, a first input of the first MMI splitting device selectively optically coupled to first and second outputs of the second MMI splitting device in response to the first and second phase control devices, a second input of the first MMI splitting device selectively optically coupled to the first and second outputs of the second MMI splitting device in response to the first and second phase control devices.

2. The apparatus of claim 1 wherein the first input of the first MMI splitting device is optically coupled to the first and second outputs of the first MMI splitting device, wherein the second input of the first MMI splitting device is optically coupled to the first and second outputs of the first MMI splitting device, wherein the first input of the second MMI splitting device is optically coupled to the first and second outputs of the second MMI splitting device, wherein the second input of the first MMI splitting device is optically coupled to the first and second outputs of the second MMI splitting device.

3. The apparatus of claim 1 wherein the first and second phase control devices comprise first and second waveguides, respectively, the first waveguide optically coupled between the first output and first input of the first and second MMI splitting devices, respectively, the second waveguide optically coupled between the second output and second input of the first and second MMI splitting devices, respectively.

4. The apparatus of claim 3 wherein the first and second waveguides comprise first and second rib waveguides, respectively.

5. The apparatus of claim 1 wherein each of the first and second plurality of trench capacitors comprise a corresponding plurality of charged regions that are modulated to control an index of refraction of the first and second phase control devices.

6. The apparatus of claim 1 wherein each of the first and second plurality of trench capacitors are aligned in series.

7. The apparatus of claim 1 wherein the first and second phase control devices are coupled to selectively provide a relative phase difference of approximately zero or approximately $\pi/2$ between optical beams propagating through the first and second phase control devices.

8. The method of claim 1 wherein the first plurality of trench capacitors are aligned in series and the second plurality of trench capacitors are aligned in series.

9. A method, comprising:
   splitting a first optical beam into first and second split first optical beams with a first multi-mode interference (MMI) device disposed in a semiconductor substrate;
   controlling a relative phase difference between the first and second split first optical beams by directing the first and second split first optical beams through corresponding first and second plurality of trench capacitors disposed in the semiconductor substrate;
   directing the first and second split first optical beams into first and second inputs, respectively, of a second MMI splitting device disposed in the semiconductor substrate; and
   selectively outputting the first optical beam at a first output of the second MMI splitting device and selectively outputting the first optical beam at a second output of the second MMI splitting device in response to the controlling of the relative phase difference between the first and second split first optical beams.

10. The method of claim 9 further comprising:
splitting a second optical beam into first and second split second optical beams with the first multi-mode interference (MMI) device;
controlling a relative phase difference between the first and second split second optical beams by directing the first and second split second optical beams through the first and second plurality of trench capacitors disposed in the semiconductor substrate, respectively;
directing the first and second split second optical beams into the first and second inputs, respectively, of the second MMI splitting device; and
selectively outputting the second optical beam at the first output of the second MMI splitting device and selectively outputting the first optical beam at the second output of the second MMI splitting device in response to the controlling of the relative phase difference between the first and second split second optical beams.

11. The method of claim 9 wherein controlling the relative phase difference between the first and second split first optical beams comprises modulating a plurality of charged regions disposed about the first and second plurality of trench capacitors to control an index of refraction of the semiconductor substrate.

12. The method of claim 11 wherein modulating the plurality of charged regions comprises modulating voltages applied to the first and second plurality of trench capacitors.

13. A method, comprising:
selectively optically coupling a first one of a plurality of outputs of a first optical switch to one of a plurality of inputs of the first optical switch;
optically coupling a first input of a multi-mode interference (MMI) X-coupling device to the first one of the plurality of optical outputs of the first optical switch, a second output of the MMI X-coupling device optically coupled to the first input of the MMI X-coupling device; and
selectively optically coupling one of a plurality of outputs of a second optical switch to a first one of a plurality of inputs of the second optical switch, the first one of the plurality of inputs of the second optical switch optically coupled to the second output of the MMI X-coupling device,
wherein the first and second optical switches each include first and second MMI splitting devices optically coupled together via phase control devices having a plurality of trench capacitors therein.

14. The method of claim 13 further comprising:
selectively optically coupling a first one of a plurality of outputs of a third optical switch to one of a plurality of inputs of the third optical switch;
optically coupling a second input of the MMI X-coupling device to the first one of the plurality of optical outputs of the third optical switch, a first output of the MMI X-coupling device optically coupled to the second input of the MMI X-coupling device; and
selectively optically coupling one of a plurality of outputs of a fourth optical switch to a first one of a plurality of inputs of the fourth optical switch, the first one of the plurality of inputs of the fourth optical switch optically coupled to the first output of the MMI X-coupling device.

15. The method of claim 14 further comprising:
selectively optically coupling a second one of the plurality of outputs of the first optical switch to one of the plurality of inputs of the first optical switch;
optically coupling the second one of the plurality of outputs of the first optical switch to a second one of the plurality of inputs of the fourth optical switch; and
selectively optically coupling one of the plurality of outputs of the fourth optical switch to the second one of a plurality of inputs of the fourth optical switch.

16. The method of claim 14 further comprising:
selectively optically coupling a second one of the plurality of outputs of the second optical switch to one of the plurality of inputs of the second optical switch; optically coupling the second one of the plurality of outputs of the third optical switch to a second one of the plurality of inputs of the third optical switch; and
selectively optically coupling one of the plurality of outputs of the third optical switch to the second one of a plurality of inputs of the second optical switch.

17. An apparatus, comprising:
a multi-mode interference (MMI) X-coupling device disposed in a semiconductor substrate, having a first MMI input optically coupled to a second MMI output and having a second MMI input optically coupled to a first MMI output;
a first optical switching device disposed in the semiconductor substrate, having a second output optically coupled to the first MMI input, the first optical switching device having first and second inputs selectively optically coupled to the first MMI input;
a second optical switching device disposed in the semiconductor substrate, having a first output optically coupled to the second MMI input, the second optical switching device having first and second inputs selectively optically coupled to the second MMI input;
a third optical switching device disposed in the semiconductor substrate, having a second input optically coupled to the first MMI output, the third optical switching device having first and second outputs selectively optically coupled to the first MMI output; and
a fourth optical switching device disposed in the semiconductor substrate, having a first input optically coupled to the second MMI output, the fourth optical switching device having first and second outputs selectively optically coupled to the second MMI output,
wherein the optical switching devices each include first and second MMI splitting devices optically coupled together via first and second phase control devices having a plurality of trench capacitors therein.

18. The apparatus of claim 17 wherein the first optical switching device further includes a first output optically coupled to first input of the third optical switching device, the first output of the first optical switching device selectively optically coupled to the first and second inputs of the first switching device, the first input of the third optical switching device selectively optically coupled to the first and second outputs of the third switching device.

19. The apparatus of claim 17 wherein the first optical switching device further includes a first output optically coupled to first input of the third optical switching device, the first output of the first optical switching device selectively optically coupled to the first and second inputs of the first switching device, the first input of the third optical switching device selectively optically coupled to the first and second outputs of the third switching device.

20. The apparatus of claim 17 wherein the first and second MMI splitting devices have first and second outputs optically coupled to first and second inputs, respectively, of the second MMI splitting device, the first input of the second MMI splitting device optically coupled to the first output of the first MMI splitting device through the first phase control device, the second input of the second MMI splitting device optically coupled to the second output of the first MMI splitting device through the second phase control device, the first input of the first MMI splitting device selectively optically coupled to the first and second outputs of the second MMI splitting device in response to the first and second phase control devices, the second input of the first MMI splitting device selectively optically coupled to the first and second outputs of the second MMI splitting device in response to the first and second phase control devices.

21. The apparatus of claim 20 wherein each of the first and second phase control devices comprise a plurality of charged regions that are modulated to control an index of refraction of the first and second phase control devices.

22. The apparatus of claim 20 wherein each of the first and second phase control devices comprise a plurality of trench capacitors.

23. An apparatus, comprising:
- a multi-mode interference (MMI) X-coupling device disposed in a semiconductor substrate, having a first MMI input optically coupled to a second MMI output and having a second MMI input optically coupled to a MMI first output; and
- a first plurality and a second plurality of optical switches, each one of the first and second plurality of optical switches including a plurality of optical inputs and a plurality of optical outputs, each one of the plurality of optical outputs of the first and second plurality of optical switches selectively optically coupled to one of the plurality of optical inputs of the respective first and second plurality of optical switches,
- a first one of the plurality of outputs of a first one of the first plurality of optical switches optically coupled to the first MMI input,
- a first one of the plurality of inputs of a first one of the second plurality of optical switches optically coupled to the first MMI output,
- a first one of the plurality of outputs of a second one of the first plurality of optical switches optically coupled to the second MMI input,
- a first one of the plurality of inputs of a second one of the second plurality of optical switches optically coupled to the second MMI output,
- wherein the optical switches each include first and second MMI splitting devices optically coupled together via phase control devices having a plurality of trench capacitors therein.

24. The apparatus of claim 23 wherein a second one of the plurality of outputs of the first one of the first plurality of optical switches is optically coupled to a second one of the plurality of inputs of the second one of the second plurality of optical switches.

25. The apparatus of claim 23 wherein a second one of the plurality of outputs of the second one of the first plurality of optical switches is optically coupled to a second one of the plurality of inputs of the first one of the second plurality of optical switches.

* * * * *

UNITED STATES PATENT AND TRADEMARK OFFICE
CERTIFICATE OF CORRECTION

PATENT NO. : 6,603,893 B1
DATED : August 5, 2003
INVENTOR(S) : Liu et al.

It is certified that error appears in the above-identified patent and that said Letters Patent is hereby corrected as shown below:

Column 10,
Line 45, delete "claim 1", insert -- claim 10 --.

Signed and Sealed this

Second Day of March, 2004

JON W. DUDAS
*Acting Director of the United States Patent and Trademark Office*